United States Patent
Westphal et al.

(10) Patent No.: US 8,643,946 B2
(45) Date of Patent: Feb. 4, 2014

(54) AUTOFOCUS DEVICE FOR MICROSCOPY

(75) Inventors: Peter Westphal, Jena (DE); Daniel Bublitz, Jena (DE); Reiner Mitzkus, Goettingen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 702 days.

(21) Appl. No.: 12/305,183

(22) PCT Filed: Jun. 15, 2007

(86) PCT No.: PCT/EP2007/005309
§ 371 (c)(1),
(2), (4) Date: May 12, 2009

(87) PCT Pub. No.: WO2007/144197
PCT Pub. Date: Dec. 21, 2007

(65) Prior Publication Data
US 2010/0033811 A1    Feb. 11, 2010

(30) Foreign Application Priority Data
Jun. 16, 2006   (DE) .......................... 10 2006 027 836

(51) Int. Cl.
*G02B 21/00*   (2006.01)

(52) U.S. Cl.
USPC ........................................................ 359/368

(58) Field of Classification Search
USPC ..................... 359/368–398; 250/201.3–201.4
See application file for complete search history.

(56) References Cited

U.S. PATENT DOCUMENTS

| | | | |
|---|---|---|---|
| 4,852,985 A * | 8/1989 | Fujihara et al. | ............. 359/387 |
| 5,239,170 A | 8/1993 | Hughlett | |
| 5,587,832 A | 12/1996 | Krause | |
| 5,604,344 A | 2/1997 | Finarov | |
| 5,923,466 A | 7/1999 | Krause et al. | |
| 6,016,367 A | 1/2000 | Benedetti et al. | |
| 6,144,489 A | 11/2000 | Wilson et al. | |
| 6,310,687 B1 | 10/2001 | Stumbo et al. | |
| 6,399,935 B1 | 6/2002 | Jovin et al. | |

(Continued)

FOREIGN PATENT DOCUMENTS

| | | |
|---|---|---|
| DE | 37 28 257 A1 | 5/1988 |
| DE | 197 02 753 A1 | 7/1998 |

(Continued)

*Primary Examiner* — Alessandro Amari
*Assistant Examiner* — Jie Lei
(74) *Attorney, Agent, or Firm* — Patterson Thuente Pedersen, P.A.

(57) ABSTRACT

A microscope including an objective, which images a sample along a microscope beam path, and an autofocus device, which is coupled into the microscope beam path via a beam splitter at a location behind the objective. A light modulator for generating a two-dimensional, intensity-modulated modulation object, is located in the autofocus beam path in a plane conjugated to the focal plane of the objective or intersects the latter and is imaged into the focal plane of the objective. A camera records a two-dimensional image onto which the modulation object's image is imaged. The image plane of the camera intersects a plane that is conjugated to the modulation object or is located in the plane and the camera detecting the contrast of the modulation object's image located in the sample.

52 Claims, 8 Drawing Sheets

(56) References Cited

U.S. PATENT DOCUMENTS

| | | | |
|---|---|---|---|
| 6,545,756 B1 | 4/2003 | Ganeev et al. | |
| 6,545,765 B1 | 4/2003 | Ganser et al. | |
| 6,567,163 B1 | 5/2003 | Sandstrom | |
| 6,640,014 B1 | 10/2003 | Price et al. | |
| 6,674,572 B1 * | 1/2004 | Scheruebl et al. | 359/368 |
| 6,677,565 B1 * | 1/2004 | Wahl et al. | 250/201.3 |
| 6,687,052 B1 | 2/2004 | Wilson et al. | |
| 2003/0035109 A1 | 2/2003 | Hartwich et al. | |
| 2003/0063376 A1 | 4/2003 | Shimizu et al. | |
| 2003/0086145 A1 * | 5/2003 | DeSimone et al. | 359/290 |
| 2004/0021936 A1 | 2/2004 | Czarnetzki et al. | |
| 2004/0129858 A1 | 7/2004 | Czarnetzki et al. | |
| 2007/0102620 A1 | 5/2007 | Bublitz et al. | |

FOREIGN PATENT DOCUMENTS

| | | |
|---|---|---|
| DE | 697 04 554 T2 | 8/2001 |
| DE | 100 13 254 A1 | 10/2001 |
| DE | 101 12 639 A1 | 9/2002 |
| DE | 101 27 284 A1 | 12/2002 |
| DE | 600 00 406 T2 | 1/2003 |
| DE | 102 44 431 A1 | 4/2003 |
| DE | 103 19 182 A1 | 12/2004 |
| GB | 2 313 508 A | 11/1997 |
| WO | WO 00/43820 | 7/2000 |
| WO | WO 03/060587 A1 | 7/2003 |
| WO | WO 2004/097493 A1 | 11/2004 |

* cited by examiner

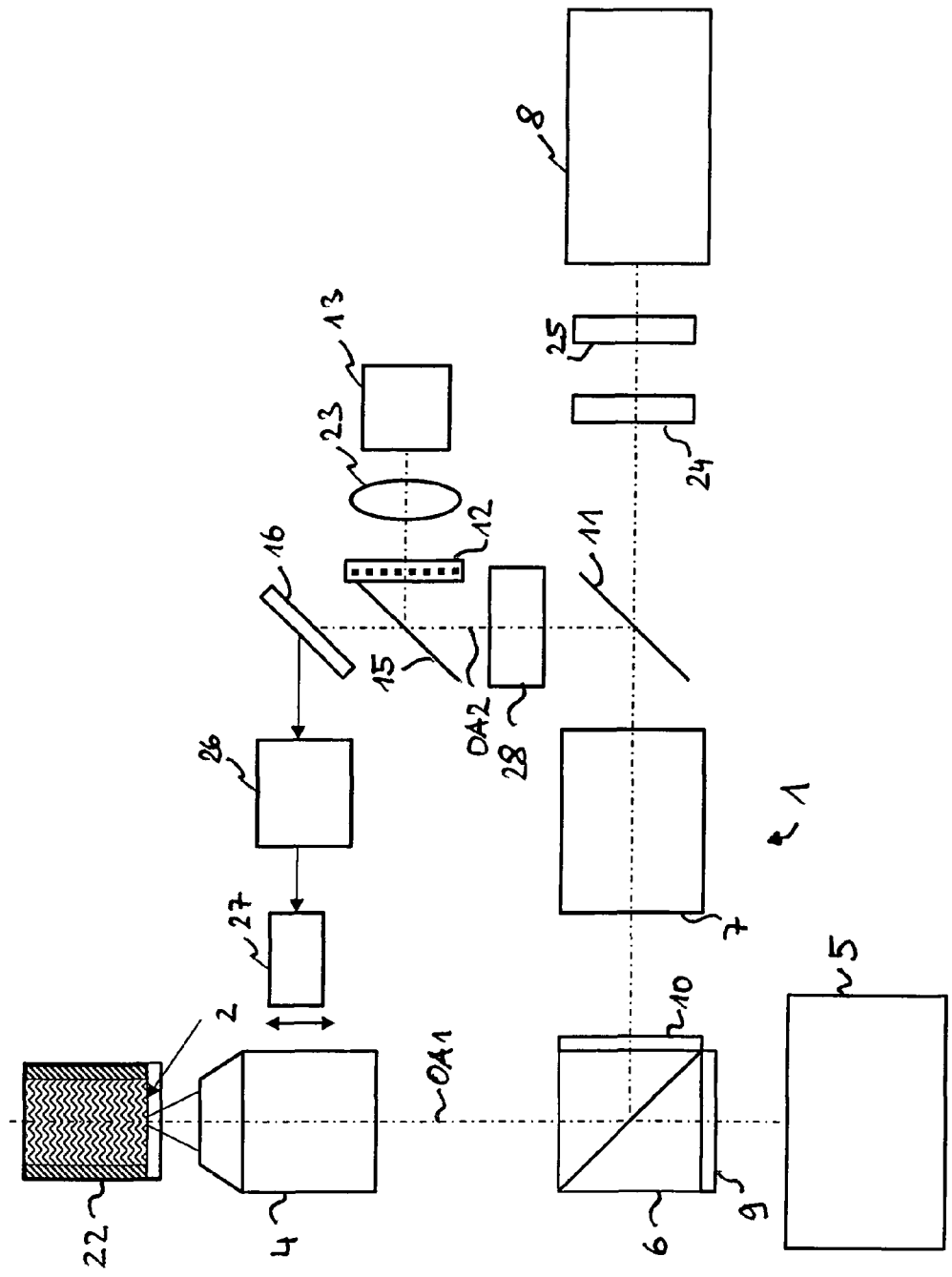

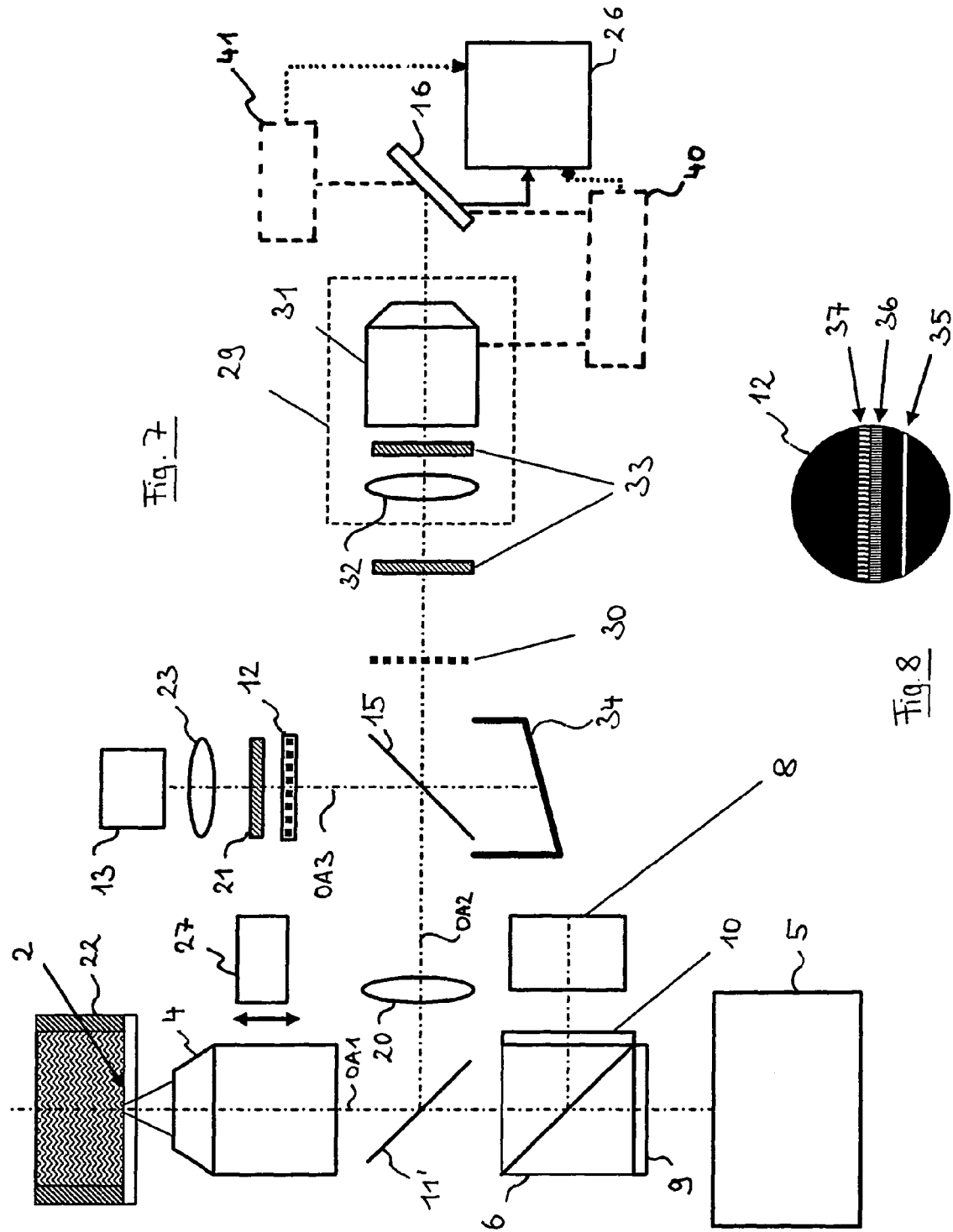

AUTOFOCUS DEVICE FOR MICROSCOPY

RELATED APPLICATIONS

This application claims priority to PCT Application No. PCT/EP2007/005309, filed Jun. 15, 2007, which claims priority to Germany Patent Application No. 10 2006 027 836.4, filed Jun. 16, 2006, the disclosures of which are hereby incorporated herein by reference in their entirety.

FIELD OF THE INVENTION

The invention relates to a microscope comprising an objective which images a sample along a microscope beam path and an autofocus device which is coupled into the microscope beam path by reflection on a beam splitter.

BACKGROUND

Obtaining precise images of a sample or a sample section, respectively, by means of imaging optics requires the sample to be placed exactly in the focal position of the objective. If the image is out of focus, it is important to find out by what amount and in which direction a change in the position of the sample relative to the imaging optics or relative to the objective, respectively, has to be effected, and, if necessary, to derive corresponding adjusting commands that can be used for re-focusing. In this connection, basically the triangulation method, imaging methods using contrast evaluation, and position determination by means of an inclined confocal slit diaphragm are known. In triangulation methods, a collimated laser beam is reflected into the pupil plane of an objective, and the z-position of the laser light reflected by the sample is deduced from the course of said laser beam relative to the imaging beam path. However, during imaging of the laser light into planes of the sample located at different depths, image defects occur so that the autofocus quality varies significantly over a given depth-of-focus range. Also, variations can be established as to whether the result of measurement is determined from the middle or on the edge of the sample or of the detector used, respectively. Therefore, a triangulation method is usually carried out iteratively, which is relatively time-consuming.

In imaging methods with contrast evaluation, the sample is illuminated with a specific intensity distribution, generally by placing a grating in a field aperture plane of an illumination beam path. A series of images is recorded with different distances between the imaging optics and the sample and, among the images in this series, the one having the highest contrast is determined to which the optimal focal distance is then assigned. This has the disadvantage of requiring high-precision placement at different z positions so as to record the series of images, which is in turn time-consuming. Examples of an autofocus device analyzing the contrast of a pattern projected onto a sample are to be found in U.S. Pat. Nos. 5,604,344 or 6,545,756.

During position determination by means of an inclined confocal slit diaphragm, a slit diaphragm is placed in a field aperture plane of the illumination beam path and is imaged onto the sample. The light reflected by the sample is directed onto a CCD line that is inclined relative to the slit diaphragm and the position on the CCD line is determined at which the reflected light has a maximum. This method is very quick; however, it does have problems with impurities on the sample or sample surface that may lead to intensity variations. Also, a very large amount of adjustment is required when imaging the slit onto the CCD line, because the slit has to be very narrow in order to be able to achieve high precision. An improvement to position determination by means of an inclined confocal slit diaphragm is described in DE 10319182 A1.

All these methods have in common that, while they can find the focal plane very precisely, they allow determination of said focal plane within the sample, especially with respect to further interfaces, only to a limited extent.

However, in many cases it is desired not only to exactly find the plane of measurement, but also to determine the position of said plane, i.e. its distance from a reference plane. In the prior art, referencing to an interface which serves as a reference plane can be effected by using a second autofocus device being focused on the interface. This naturally increases optical complexity and generally makes it necessary to reserve an area of the detection or illumination aperture, respectively, for this additional autofocus. The use of several autofocus beam paths is described, for example, in WO 00/43820. On the other hand, it is known in the state of the art to interrupt measurement for a short time and to adjust the autofocus device to the desired reference plane by a focus adjustment. The absolute value of the focus adjustment then represents a measure for the distance from the measurement plane to the reference plane. This has the disadvantage that the actual microscopic measurement for determining the distance from the reference plane has to be interrupted.

The same problems arise when an object that may be present at different z-positions has to be found or traced in a sample. Such an object may be, for example, a cell present in a sample and moving in the sample (e. g. in a liquid solution).

SUMMARY OF THE INVENTION

Thus, it is an object of the invention to provide a microscope comprising an autofocus device by which not only the position of the plane of measurement can be determined exactly, but at the same time the distance from a reference plane is detectable or object tracking or an object finder is possible. In particular, a separate autofocus device, which is provided only for determining the reference plane, and/or repeated adjustment of the focus position in the direction of z should be avoided.

This object is achieved by a microscope comprising an objective that has a focal plane lying in a sample volume, and comprising an autofocus device, which includes: a light modulator for generating a luminous, intensity-modulated modulation object; autofocus illumination optics, which image the luminous modulation object into or intersecting the focal plane of the objective, so that an image of the modulation object is formed in the sample volume, imaging of the modulation object being effected via a beam splitter which reflects the beam path of the autofocus illumination optics into the microscope beam path; a camera for recording a two-dimensional image, said camera having a camera image plane; and autofocus imaging optics, which image the modulation object's image located in the sample volume into an autofocus image plane, wherein the camera image plane intersects the autofocus image plane if the image of the modulation object is located in the focal plane, and wherein the camera image plane is located in the autofocus image plane if the image of the modulation object intersects the focal plane.

Thus, the invention provides a microscope, comprising an objective, which images a sample along a microscope beam path, and an autofocus device, which comprises an autofocus beam path that is coupled into the microscope beam path via a beam splitter and comprises:

a light modulator for generating a luminous, two-dimensional, intensity-modulated modulation object, which is located in the autofocus beam path and either is located in a plane conjugated to the focal plane of the objective or intersect the latter, and which object is imaged into the focal plane of the objective, and a camera for recording a two-dimensional image onto which camera the autofocus beam path images the modulation object's image located in the sample, with the image plane of the camera intersecting a plane that is conjugated to the modulation object or being located in said plane and with the camera detecting the contrast of the modulation object's image located in the sample, the modulation object and/or the image plane of the camera being inclined with respect to the optical axis of the autofocus beam path.

The invention provides for generating a preferably two-dimensional modulation object, e.g. by illumination of a corresponding light modulator (grating, liquid crystal display (LCD) or digital micromirror device(DMD)), and reflecting it into the microscope beam path, e.g. the illumination beam path, so as to achieve structured autofocus illumination of the sample. Said structured illumination is effected via a separate source of light which is independent of the source of illumination, preferably via light emitting diode(LED). Of course, any sources of white-light or colored illumination are possible. The two-dimensional illumination object preferably radiates in a spectral range that is not needed for sample imaging. In addition, a two-dimensional camera (e. g. charge coupled device(CCD) or complementary metal oxide semiconductor(CMOS)) is inserted in the beam path in one place thereof.

The modulation object modulates spatially. Additionally it can modulate temporally by use of an adjustable light modulator. Temporal modulation is an alternative to spectral separation for distinguishing the illumination by the modulation object from the remaining microscope illumination. In this case, the detection of the autofocus image is synchronized with the temporal modulation; for example, a lock-in technique may be employed. In order to avoid, if possible, any interference with the imaging of the sample, said temporal modulation is preferably effected at a frequency which is so high that it is not perceivable by visual inspection in the microscope, e. g. through a microscope eyepiece. A possible frequency range is above the image fusion frequency of the eye, which is approximately 50 Hz in the bright-adapted state. For example, a possible range is between 50 and 200 Hz.

The coupling in and coupling out of the structured illumination as well as of the image of the sample, which is illuminated in a structured manner onto the camera may preferably be effected using beam-splitting mirrors which have only a weak influence on the remaining microscope beam path, e.g. due to their high transmittance (ca. 95% and higher are possible). Dichroic separation in combination with spectrally separated autofocus radiation is particularly preferred. Further, it is favorable to apply an antireflection coating to one side of the splitter/s so as to exert as little influence as possible on the remaining microscope beam path. If necessary, reflectance may also be increased, of course, at the cost of transmittance. For example, if the autofocus system works with an infrared (NIR) light source, the dichroic beam splitter is, of course, preferably provided such that it guides the autofocus radiation, or couples it in/out, in the autofocus beam path in a highly efficient manner.

Advantageously, a periodic illumination is effected by imaging the modulation object, e.g. stripe illumination, in which case the modulation object is a stripe pattern. A corresponding periodic pattern, e.g. a stripe pattern, then appears on the camera, the contrast of said pattern being at a maximum in the plane conjugated to the actual focal plane. This allows to realize a very reliable and precise autofocus system for interfaces at the sample (e. g. glass/water, glass/air or water/air). In a two-dimensional light modulator, redundant information can be obtained by means of a second dimension of the camera, thus preferably forming a very robust autofocus signal by averaging several line signals.

In order to influence the sample as little as possible by imaging of the modulation object, the structure of a spatially modulated modulation object is in one embodiment laterally displaced at high rate (e.g. at more than 30 Hz) in an alternating manner. A further possibility, which is also given in the case of an adjustable light modulator, consists in illuminating, permanently or temporarily (e.g. upon finding an object to be microscoped), only certain partial areas of the object field/sample volume detected by the objective. This allows to increase the image contrast for the autofocus or for tracking of the object of measurement, but optionally also for normal microscope detection.

It is essential for the invention that either the modulation object is inclined with respect to the focal plane of the objective or the camera image plane is inclined with respect to the autofocus imaging optics. It is even possible for both to be inclined accordingly. The inclination can be achieved in that the modulation object or that the camera is inclined with respect to the optical axis. Thus, the modulation object may be inclined with respect to the optical axis and the image plane of the camera may be perpendicular to the optical axis; the modulation object may be perpendicular to the optical axis and the image plane of the camera may be inclined with respect to the optical axis; or a mutual inclination of the modulation object and the image plane is possible, which then have to be inclined in opposite directions with respect to the optical axis.

The use of several cameras also enables a three-dimensional image object tracking system or autofocus system. Thus, a second camera can be additionally arranged perpendicular to the optical axis, and a third camera is rotated about a tilt axis that does not coincide with the tilt axis of the first camera.

The structured autofocus illumination may, of course, be realized in transmitted-light mode and/or in dark field illumination mode. However, in the transmitted-light mode, the application would then be restricted to transparent sample carriers.

It is preferable for all variants of the microscope to use a computational evaluating device which performs signal evaluation of the camera(s), controls a light modulator that may optionally be adjustable and performs control of optionally present mechanical adjusting units on the microscope (e. g. for focus adjustment, for x-y adjustment, for swiveling and/or coupling filters into the beam path, etc.). Evaluation and control can be implemented both by circuitry and by software. During operation, the autofocus system of the invention is, of course, controlled by a control device which comprises the computational evaluation device and initiates the measures explained here in order to realize the described procedure. The control device may be one that is already provided in the microscope anyway.

For highly light-scattering surfaces, an improvement of the invention is possible that analyzes the light reflected or scattered by the sample. In this case, it is envisaged that both the camera and the modulation object are tilted with respect to the optical axis. Both are located in mutually conjugated planes. The tilt angle is preferably the same. Light scattered or reflected by the sample is imaged onto the camera in modulated form. The intensity of said modulation provides structural information on the sample and may be used for autofocus and/or for image-tracing purposes. Due to the inclination of the modulation object and of the camera, structural information is simultaneously obtained from different depths (z positions of the objective's focal plane) of the sample.

In unfavorable cases, the light modulation being detected on the camera, i. e. the image of the object imaged into the sample, may be impaired by speckle effects. It may be advantageous for such purposes to uniformly or periodically move the sample or the modulation object and/or optionally the light source illuminating it so as to average out speckle patterns. As an alternative, synchronous movement of the modulation object and of the camera is possible, too.

In principle, further cameras, which derive structural information from the sample, may be coupled in by reflection. These cameras are then arranged such that different sectional planes of the sample are imaged on them, i. e. the cameras are arranged at different tilt angles to the optical axis or at different angles of rotation about the optical axis.

In order to increase the autofocus lock-in range in the z direction, a camera may be additionally mounted in a plane not conjugated to the light modulator. The lock-in range can be set by the corresponding tilt angle. The inclination of a camera arranged non-conjugated is equivalent to a change of the angle, which the modulation object encloses with the optical axis. However, since this angle can hardly be selected smaller than 30° for practical reasons due to spherical image aberrations and reflection losses, such an additional camera makes it possible to increase the lock-in range of the autofocus device.

In particular, the microscope may be provided as an inverted microscope, such as the type used, for example, to read out titer plates which comprise open-top cuvettes holding liquids. Focussing is to be effected here, as a rule, on the glass/liquid interface of the titer plate bottom to which cells adhere in most cases. Since such cells impair the contrast of the imaged modulation object, averaging is preferably effected over several lines of the two-dimensional camera in order to improve the precision of measurement.

Air or an immersion liquid may be disposed between the objective and the titer plate bottom. Without immersion liquid, the air/glass interface produces the highest contrast at the titer plate bottom. Using immersion liquid, the strongest contrast is obtained from the interface between the cuvette liquid and the upper surface of the titer plate bottom.

Particularly good adaptation to different samples is given when the light modulator is designed to be controllable and to generate a spatially or temporally intensity-modulated modulation object. This controllability may be achieved by using an illuminated LCD or DMD element as the light modulator. The employed wavelength preferably differs from the normal illumination radiation in the microscope. With respect to the light modulator and/or the camera the autofocus device may generally be coupled into the illumination beam path of an incident-light microscope. As an alternative, an irradiation parallel to the incident-light illumination beam path into the microscope beam path is possible, i. e. a separate beam splitter for the autofocus beam path is located in the microscope beam path. Use can then be made of radiation whose wavelength is larger than the wavelengths used for microscoping operations, because then there is no need to take into account any dichroic properties of the illumination beam splitter of the microscope—the autofocus device is coupled via a separate beam splitter. In fluorescence microscopy, wavelengths exceeding 800 nm are preferred for autofocus illumination, because no noticeable limitations will have to be expected for fluorescence measurements or transmitted-light measurements. Using a suitable spectral filter in front of the camera of the autofocus device, potentially interfering radiation of the microscope illumination can be effectively suppressed and blocked out in the autofocus device. For simultaneous application of the autofocus in 2-photon microscopy, the beam splitter is adapted to reflect only a narrow wavelength range, e.g. 20 nm, which does not overlap with the 2-photon excitation radiation wavelength region. Basically, however, the entire visible range and UV can also be used for the autofocus function.

A particularly simple analysis of the modulation object imaged into the sample is obtained if the imaged modulation object comprises a periodic structure, e. g. a stripe grating pattern. Thus, the light modulator is designed accordingly.

Conveniently, the autofocus device will be reflected into the beam path of the microscope via a beam splitter, with both the image of the modulation object and the reflection of the imaged modulation object onto the camera being simultaneously coupled in via the same beam splitter. Structural adaptation to an existing microscope is then particularly easy, although this is not stringently required.

The angle of inclination of the image plane of the camera or of the modulation object with respect to the optical axis sets the lock-in range or the range of depth, respectively, in which the autofocus device operates. An angle of between 20° and 70° is convenient. As already mentioned, a plurality of cameras may be used whose image planes are inclined relative to each other, especially with different inclinations.

As already mentioned, there are various means of separating the image of the modulation object from the sample imaging radiation or of making the former distinguishable from the latter. A first approach consists in spectral separation. The image of the modulation object is then in a spectral range that is either not used or not needed for imaging the sample. Imaging of the modulation object into the sample as well as imaging of this image, or of the reflections generated in the sample, onto the camera is then effected via suitable dichroic beam splitters or a central dichroitic beam splitter, respectively. A further possibility consists in temporal modulation of the light modulator combined with suitable synchronized detection of the image of the modulation object. According to this approach, the autofocus radiation and the normal sample imaging radiation may be within the same spectral range. In order to avoid that the autofocus device influences normal sample imaging, it is advantageous to provide then a variation of the spatial modulation, so that, e.g. a stripe grating imaged into the sample is not visible in the sample when averaged over time. The case is different if detection is effected synchronously with the temporal variation as is then the case for the camera of the autofocus beam path.

When working with spectral separation of the autofocus radiation and of the sample imaging radiation, it is advantageous, of course, to suppress in the autofocus beam path the spectral ranges of the sample imaging radiation, if possible. Thus, any spectral components passing a dichroic beam splitter, for example, and thereby also entering the autofocus beam path, will then preferably be suppressed by suitable filters. Particularly good filtering is possible if the modulation object's image located in the sample is imaged onto the camera with an intermediate image in-between. This will leave sufficient constructional space for the use of cut-off filters.

Further suppression of interfering radiation is achieved by providing a beam trap at the beam splitter which separates in the autofocus beam path the illumination, i.e. imaging of the modulation object into the sample, from detection, i. e. imaging of the image located in the sample onto the camera which trap absorbs otherwise unused radiation that is transmitted by said beam splitter.

The use of an intermediate image has the further considerable advantage that there is a great distance between the beam splitter, which separates autofocus illumination and autofocus detection, and the detecting camera. Thus, inevitably present scattered light from the beam splitter can only reach the camera via multiple reflections, i.e. greatly attenuated. Moreover, the use of an intermediate image additionally suppresses reflections from optical lens systems located between the beam splitter and the camera.

The invention will be explained in more detail below, by way of example and with reference to the drawing.

It will be appreciated that the above-mentioned features and those yet to be explained below can be used not only in the combinations indicated, but also in other combinations, or alone, without departing from the spirit or scope of the present invention.

BRIEF DESCRIPTION OF THE DRAWINGS

The invention will be explained in more detail below, by way of example and with reference to the drawing wherein:

FIG. 6 shows an inverted microscope comprising an autofocus device with reflection in the microscope illumination beam path;

FIG. 7 shows a microscope similar to that of FIG. 6, comprising an autofocus device, wherein intermediate imaging optics are arranged preceding a camera;

FIG. 8 shows a top view of an exemplary light modulator, and

DETAILED DESCRIPTION

Figure 1:
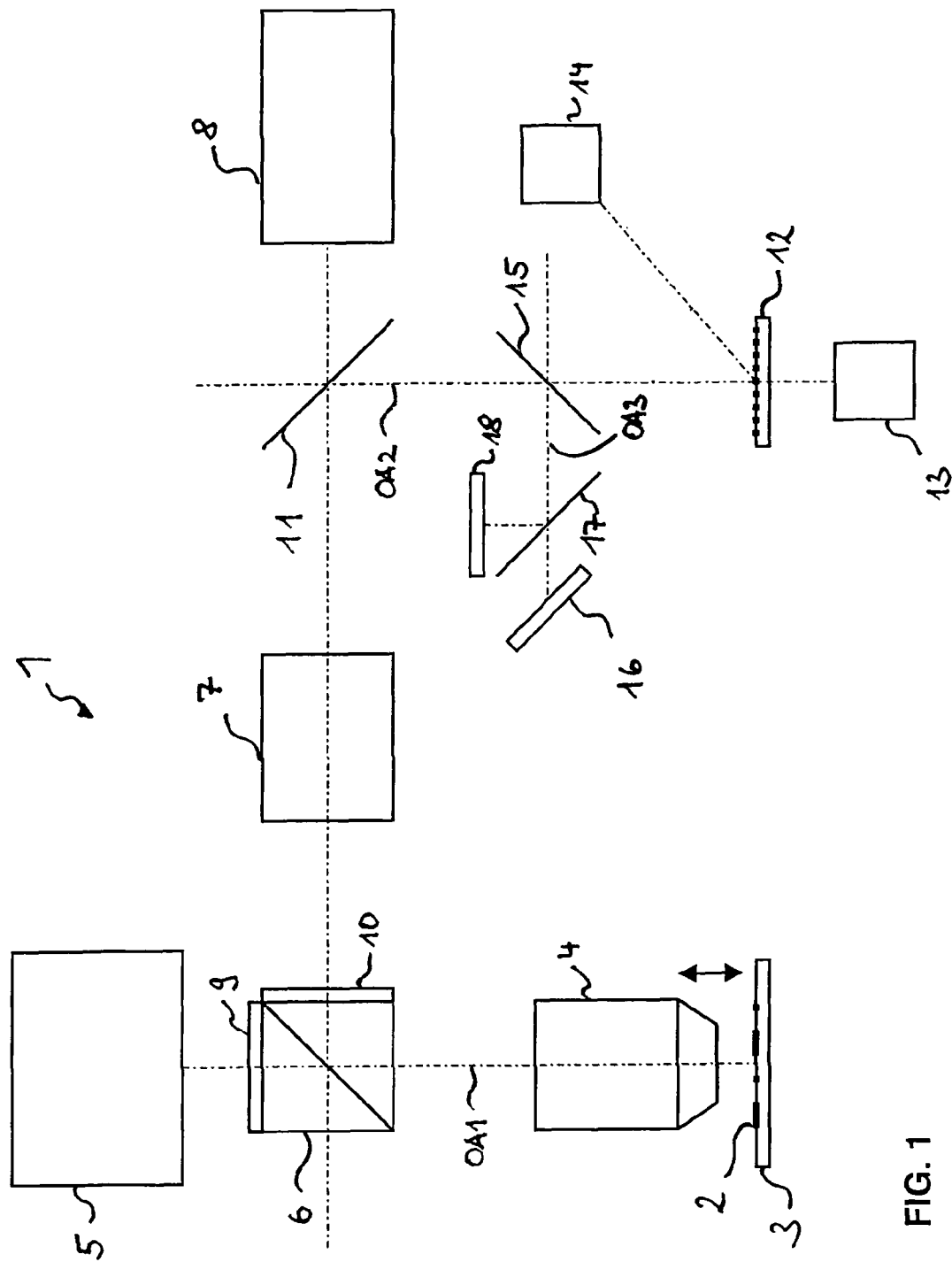
FIG. 1 shows a microscope comprising an autofocus device for reflection measurements.

FIG. 1 shows a microscope 1, which images a sample 2 being arranged on a sample carrier 3 onto a detector 5 by means of an objective 4. The representation in FIG. 1 is strongly simplified. The microscope 1 may be a wide field microscope, i. e. the detector 5 is, for example, a camera or an eye lens of the eyepiece. However, any other microscope design is suitable for the microscope 1, for example a laser scanning microscope. In this case, a scanning arrangement is also provided in the microscope beam path, said scanning arrangement being located on the optical axis OA1. The objective 4 is shiftable in its focus position, as indicated by the double arrow. Alternatively, the sample carrier 3 may be shiftable, too.

Microscope illumination radiation from a microscope illumination source 8 is coupled in at a beam splitter 6, which may optionally be provided as a dichroite or as a plate-shaped color splitter, said microscope illumination source illuminating the sample 2 through the objective 4 via illumination tube optics 7. An autofocus device is coupled into this illumination beam path by means of a beam splitter 11. The autofocus device comprises a light modulator 12, which is for transmission mode operation illuminated by a light source 13 (e.g. an LED) or by a light source 14 (e.g. an LED) for reflection mode operation. The illuminated light modulator 12 generates a modulation object, which is projected, i.e. imaged, into the sample 2 via the beam splitter 11, the illumination tube optics 7, the beam splitter 6 as well as the objective 4. In this way, autofocus illumination is realized. In the opposite direction, the modulation object's image generated in the sample 2 is detected by means of a camera 16, preceding which a further beam splitter 15 is arranged on the optical axis OA2 of the autofocus device. The thus resulting optical axis OA3 optionally extends, additionally, via a beam splitter 17 to a camera 18.

In one embodiment of the invention, the beam splitter 11 is dichroic, and the light source 13 or 14 emits radiation at a wavelength that is essentially not emitted by the microscope illumination source 8 or is not needed for sample imaging. Thus, the autofocus device operates in a spectral range that is otherwise not used for imaging the sample 2.

The Figures generally show only the image planes of the cameras. The cameras may generally be CCD cameras.

In the construction of FIG. 1, the light modulator 12 and, thus, the modulation object is oriented perpendicular to the optical axis OA2. In contrast thereto, the image plane of the camera 16 is inclined with respect to the optical axis OA3. For example, if the light modulator 12 generates a spatial modulation, e. g. a stripe pattern, the maximum contrast is found in a line of the camera 16 that is perpendicular to the drawing plane. The position this line has on the camera 16 is a measure for the position of the focal plane along the optical axis, i. e. in the direction of z.

With the help of the illumination tube optics 7 and of the objective 4, the modulation object, which is generated by the light modulator 12 either in transmission mode (light source 13) or in reflection mode (light source 14), is imaged into the sample. Depth resolution is effected by the inclined camera 16. The use of the camera 18 additionally allows to detect a lateral displacement of the sample illuminated in a structured manner.

In the case of a fluorescence microscope, an excitation filter 10 as well as an emission filter 9 (for fluorescence radiation) are used. Without any further restriction concerning the autofocus device, the microscope 1 may also be provided as a scanning microscope, in particular as a laser scanning microscope.

Figure 2:
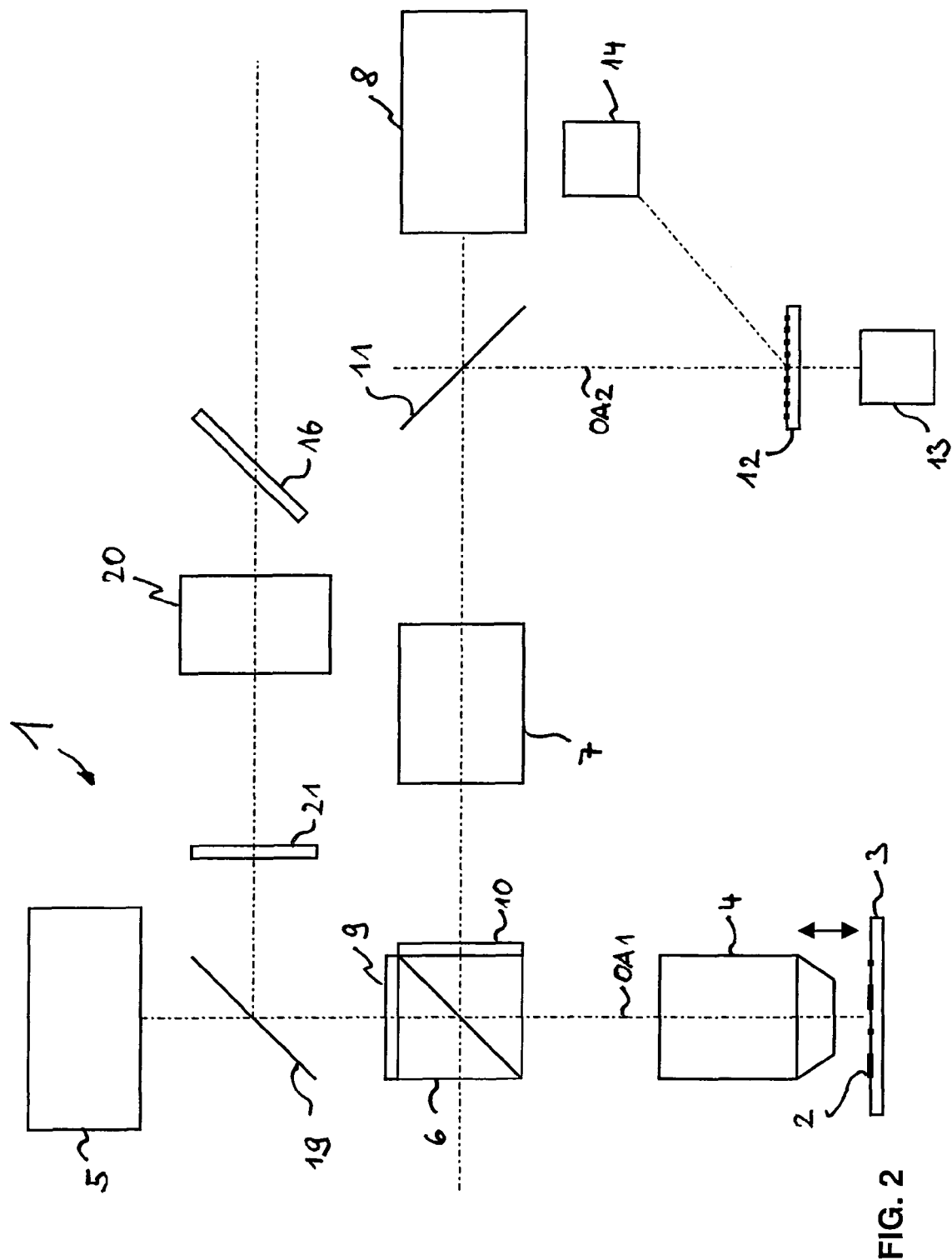
FIG. 2 shows a microscope comprising an autofocus device for fluorescence measurements.

FIG. 2 shows an alternative design of the microscope of FIG. 1 with respect to the autofocus device. In the microscope of FIG. 2, any components already explained with reference to FIG. 1 are identified by the same reference numerals; therefore, their repeated description is omitted. In this design, the camera 16 detects the fluorescence contrast of the sample, which can be enhanced further by the structured autofocus illumination.

Imaging of the modulation object is effected in a similar manner as in the set-up according to FIG. 1. However, sensing of the modulation image imaged into the sample 2 does not occur from the illumination beam path, but from the microscope beam path via an independent beam splitter 19. The latter is adapted to the wavelength of the autofocus illumination and is, for example, dichroic to the same extent as the beam splitter 11. In order to allow the camera 16 to sense the modulation object imaged into the sample or any reflections or back-scattering generated the sample by, respectively, suitable relay optics 20 are arranged preceding said camera, the optical characteristics of said relay optics 20 ensuring that the image plane of the camera 16 intersects a conjugated plane for the modulation object, ideally near or on the optical axis (as in FIG. 1, too).

The signals provided by the focus device, in particular the camera 16, are used to control a focus shift along the z axis. This is schematically shown by a double arrow in FIG. 1. The control device used for this is not shown in FIGS. 1 and 2.

If the microscope 1 in FIG. 2 is provided as a laser scanning microscope, the combination of the emission filter 9 and the excitation filter 10 is provided again, and so is, optionally, a further spectral filter 21 which ensures that the spectral range of the luminant modulation object is incident on the camera 16 and any spectral ranges of no further interest are cut off, in particular the spectral ranges of the sample imaging.

Figure 3:
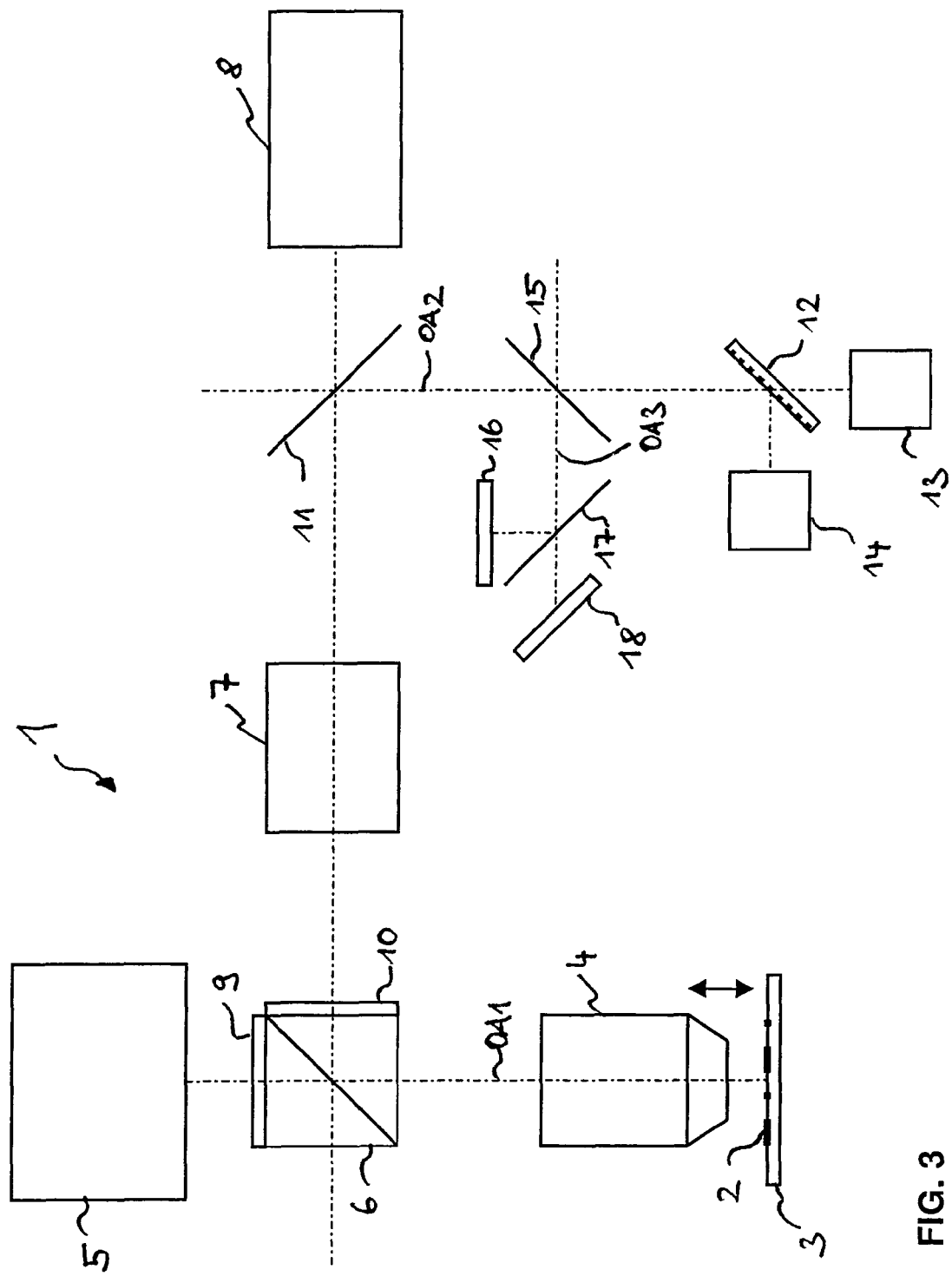
FIG. 3 shows a microscope similar to that of FIG. 1, adapted to samples that scatter.

FIG. 3 shows a design of the microscope 1 for strongly scattering and weakly reflecting samples. No further description will be given of any elements already explained with reference to FIGS. 1 or 2. They are provided with the same reference numerals in the Figure.

For strongly light-scattering surfaces, such as e.g. histological specimens, the autofocus device is modified according to FIG. 3. It is a device which primarily analyzes the light scattered by the sample.

In this arrangement, the two-dimensional light modulator 12 encloses an angle of between 0° and 90°, preferably between 20° and 70°, with the optical axis OA2. The light modulator 12 is of the already described construction, i. e. it may be a transmission LCD, a reflection LCD, a DMD or an amplitude grating with a shifting device. The structure again preferably consists of dark/bright stripes. Illumination of the light modulator 12 is preferably effected by one or more powerful LED. This was also possible in FIGS. 1 and 2. The light source 13 is provided for a transmissive modulator and the light source 14 is provided for a reflective modulator. Usual optical apparatuses for light homogenization and optics for intermediate images can be used to generate the modulation object using the light modulator 12 and are not illustrated for the sake of a better overview in FIG. 3 (and also in FIGS. 1 and 2).

With the help of the illumination tube optics 7 and of the objective 4, the modulation object is imaged into the sample 2. Since the light modulator 12 and, thus, the modulation object, is not perpendicular to the optical axis, the modulation object (e. g. alternating bright/dark stripes) is imaged to a plane inclined to the optical axis and, thus, into the depth of the sample.

The image plane of the camera 18 is located in a plane that is conjugated to the light modulator 12 and, thus, to the modulation object. That is to say, it is tilted at the same angle to the optical axis (here, the optical axis OA3) as the light modulator 12. In this manner, light scattered by the sample is imaged onto the camera 18 in a modulated manner. The contrast of the modulation object appears on the camera 18 only where it is scattered by the sample. Therefore, the design in FIG. 2 is suitable especially for thin or intransparent, scattering samples, e.g. in material microscopy.

In addition, the autofocus device also comprises for the autofocus function the camera 16, the image plane of said camera 16 being inclined with respect to the light modulator 12 and, thus, to the modulation object, because said image plane is perpendicular to the optical axis OA3. The camera is coupled in by reflection via a 50% splitter 17 within the autofocus beam path.

Figure 4:
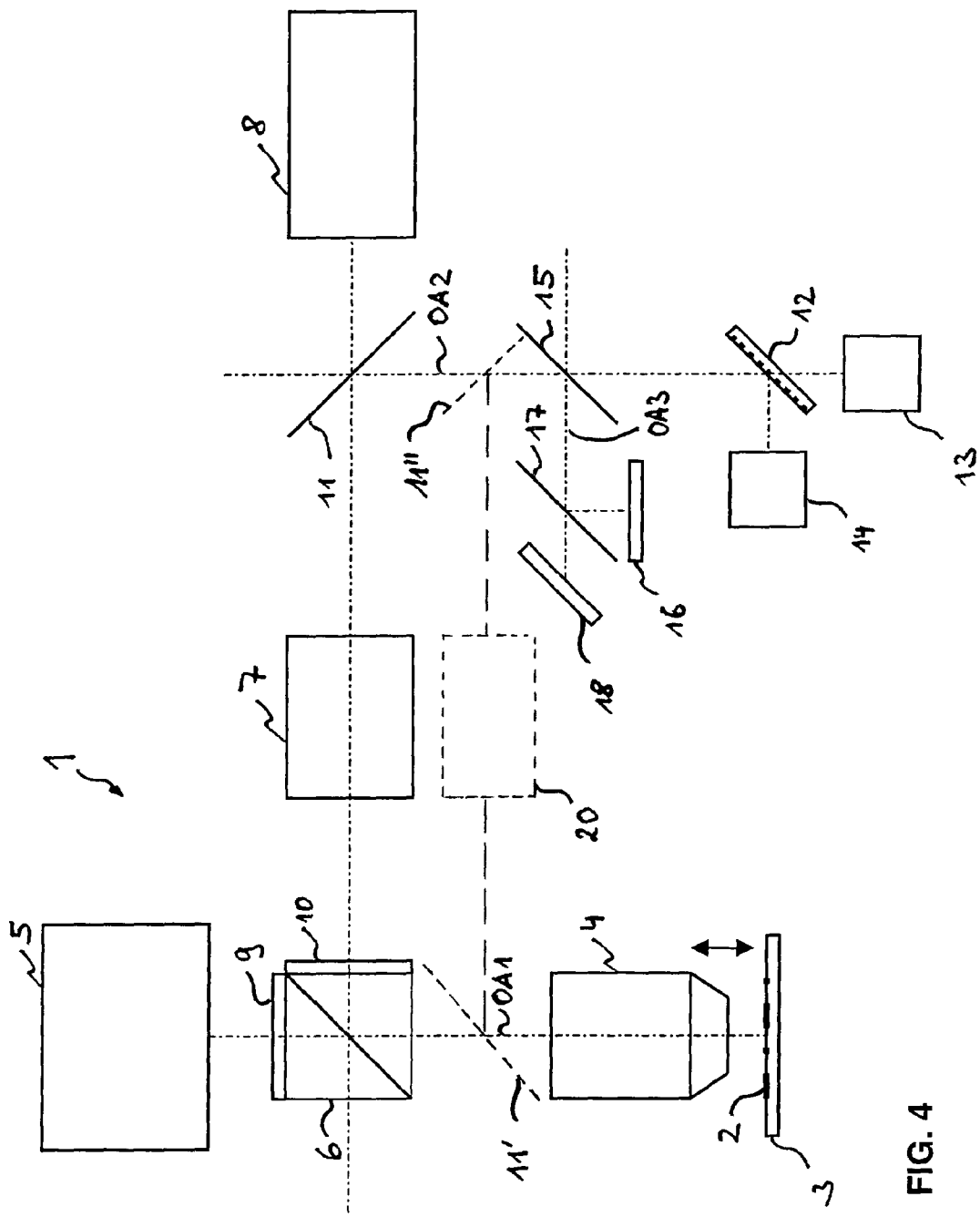
FIG. 4 shows a microscope similar to that of FIG. 1 with an increased lock-in range.

FIG. 4 shows a further modification of the microscope with respect to the autofocus device. The arrangement of FIG. 4 differs from that of FIG. 3 in that the camera 18 is now tilted in the opposite direction with respect to the light modulator. The image plane of the camera 18 and the light modulator 12 are tilted such that they are not conjugated with respect to each other. This allows to enhance the lock-in range, typically doubling it.

Another alternative for coupling the autofocus device to the beam path of the microscope 1 is shown in FIG. 4 in broken lines. In principle, this alternative is possible for all constructions of the autofocus device and it provides an independent dichroic beam splitter 11' in the microscope beam path, said beam splitter 11' coupling the radiation of the light modulator 12 in and transmitting to the camera 16 or 18 the representation of the modulation object imaged into the sample. In the view of FIG. 4, this construction then omits the beam splitter 11. Instead, a deflecting mirror 11" is optionally provided. Also, coupling-in is effected via the beam splitter 11 by means of optional optics 20, which generate a possibly required intermediate image and ensure that the modulation object, i. e. the illuminated light modulator 12, is located in a plane conjugated to the focal plane of the objective 4, so that the modulation object is imaged into the sample 2 through the objective 4. A variant of this concept will be described later with reference to FIG. 7.

The construction shown as an exemplary alternative in FIG. 4 has the advantage that the autofocus device can very reliably work simultaneously with all current microscopy operations. In particular, it is possible to use for the modulation object, i. e. the illumination of the light modulator 12, radiation whose wavelength is larger than the wavelengths used for microscopy operations. In the case of fluorescence or transmitted-light measurements, a wavelength range above 700 nm, preferably above 800 nm, can be used for the autofocus device. An additional spectral filter in front of the camera or cameras may efficiently suppress potentially interfering light from the microscope illumination.

The constructions of FIGS. 1 to 4 show the arrangement of the autofocus device in an upright microscope 1 with an object carrier as the sample holder. A cover glass as well as an immersion liquid (e.g. oil, water, glycerin) may be disposed between the object carrier and the objective. However, this is not mandatory. Thus, there are two cases of application to be distinguished: Without immersion liquid, the highest grating contrast is obtained from the air/glass interface at the upper surface of the cover glass or object carrier. With immersion liquid, the highest grating contrast is obtained from the interface between the lower surface of the cover glass and the embedding medium. In order to suppress scattered light or undesired reflections, stops, for example semi-circular stops, can be introduced into the autofocus beam path.

The beam splitter 11 or 11' may be a plane-parallel glass plate which is antireflection-coated on one side to avoiding interfering secondary images. Further, the side of the glass plate that serves to reflect the autofocus signal may comprise a dichroic coating which increases the reflectance for the long-wave autofocus light (when using the variant with long-wave autofocus illumination) and predominantly transmits the short-wave useful light of microscopy (e. g. fluorescence radiation). Of course, other spectral separations are also possible.

Figure 5:
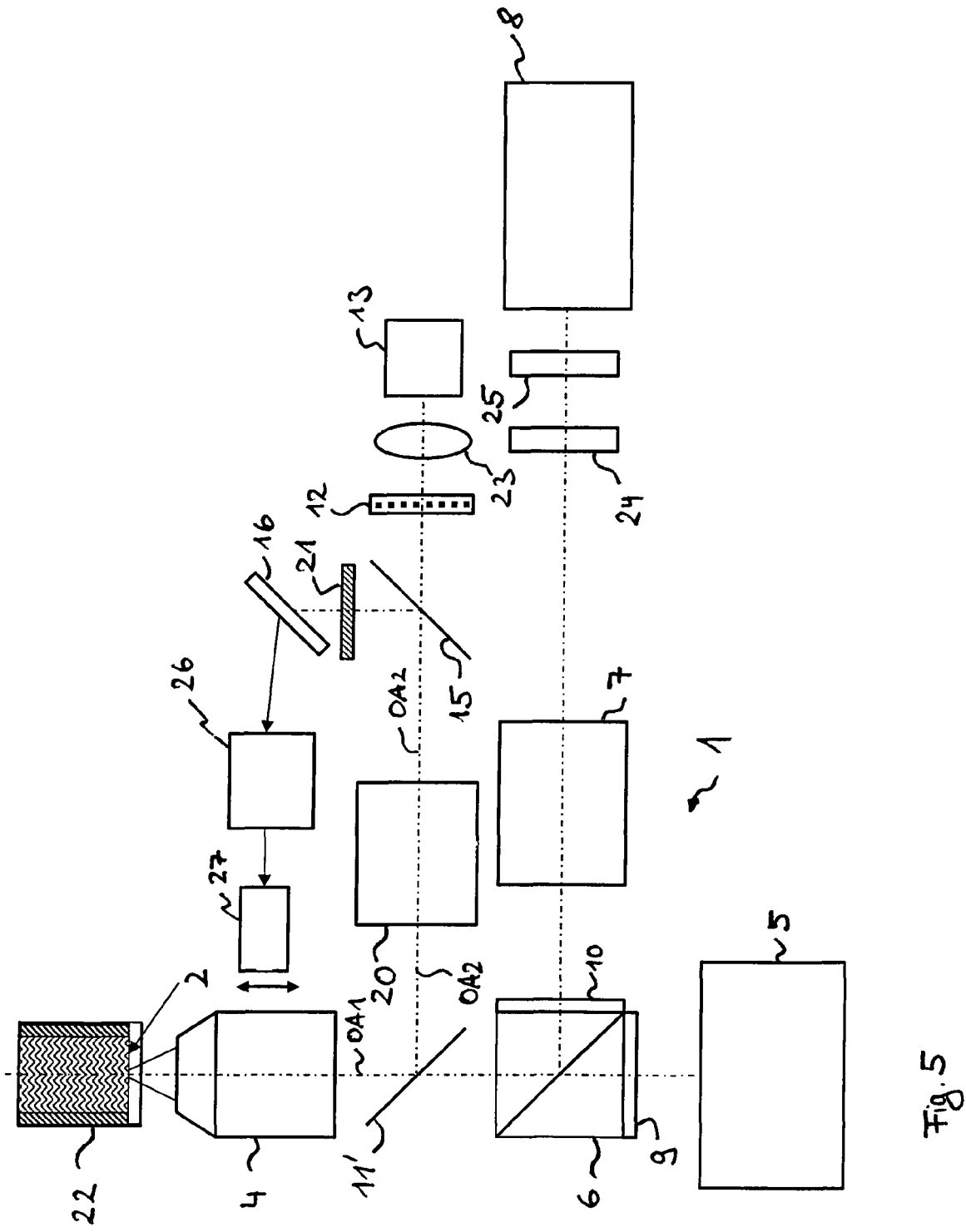
FIG. 5 shows an inverted microscope comprising an autofocus device with illumination reflected between the objective and filter cubes.

FIG. 5 shows an inverted microscope 1 comprising an autofocus device according to the invention. Such inverted microscopes are predominantly used to read out titer plates comprising open-top cuvettes 22 which hold liquids. Here, focusing is to be effected, in most cases, on the glass/liquid interface of the titer plate bottom (or its vicinity), to which cells adhere in most cases. Since these cells impair the contrast of the projected grating, i. e. of the modulation object, at least 10 lines of the plane camera 16 are evaluated in this construction. This allows averaging of the contrast signal over a larger number of lines, which considerably improves the precision of measurement. Again, air or an immersion liquid may be present between the objective 4 and the titer plate bottom; the statements already made above apply analogously. The only difference consists in that, instead of the embedding medium, an expanded liquid column is present, which is disposed above the sample in the cuvette 22.

In the construction of FIG. 5, the autofocus device is again coupled into the microscope beam path, and not into the illumination beam path, via a separate dichroic beam splitter 11'. Apart from that, the statements already made above apply analogously. In addition, FIG. 5 also shows the optional spectral filter 21. The illumination optics 23 for generating the modulation object from the light modulator 12 are also represented by way of example. For homogeneous illumination of the light modulator 12, the illumination optics 23 preferably also include a diffusing glass. Illumination optics 23 can be used in all embodiments described.

FIG. 5 further shows that the signals of the camera 16 are transmitted to a control device 26, which performs suitable calculations and which controls, among other things, the already mentioned z drive 27 for shifting the focus position. Of course, the control device 26 is usually also connected with the light modulator 12, if the latter is controllable. The same applies to the light source 13 or 14. The control device 26 and the elements connected with it are possible also in the constructions according to FIGS. 1 to 4.

FIG. 6 shows a modification of the construction of FIG. 5. In this case, with analogy to the construction of FIG. 1, the autofocus device is reflected into the illumination beam path via the beam splitter 11. The separate optics 20 may be omitted, because no autofocus illumination tube optics are then required; their function is performed by the illumination tube optics 7. FIG. 6 additionally shows optional filters 24 and 25 in the illumination beam path. Also, minifying optics 28 are arranged preceding the coupling-in via the beam splitter 11 in the imaging direction of the modulation object, said reduction optics 28 influencing the lock-in range of the autofocus device and, thus, enabling its ideal design. The optics 7, 20 and 28 may also be designed as (motorized) varifocal optics, so as to compensate for different objective magnifications.

FIG. 7 shows a further construction of a microscope comprising an autofocus device. Any components whose function and/or structure correspond(s) to elements of already described microscopes shall not be explained again here either so as to avoid unnecessary repetitions. In the autofocus device of FIG. 7, the camera 16 follows imaging optics 29. Thus, not the image of the modulation object in the sample itself, but an intermediate image 30 is imaged onto the camera 16. Of course, this principle, which is exemplified in FIG. 7 by an inverted microscope, may be quite generally applied. The light modulator provided here as a transmission grating and the intermediate image 30 are located in planes that are conjugated to the sample focus plane as well as to the plane which intersects the plane of the camera 16.

Imaging of the modulation object's image, which is located in the sample, by the use of the intermediate image 30 has the considerable advantage that the additional beam splitter 15, which may be realized, for example, as a 50:50 beam splitter, is located at a great distance from the camera 16. Thus, light scattered inevitably from the additional beam splitter 15 reaches the camera 16 only after multiple reflections, i.e. strongly attenuated. In addition, the intermediate image avoids any reflections coming from optics to the right of the additional beam splitter 15 in the direction of the camera 16.

In an exemplary embodiment of the autofocus device for the microscope of FIG. 7, an IR LED is used as the light source 13 having a centroid wavelength above 800 nm, preferably at 830 nm. The light source 13 is connected with the control device 26, so that is switched on or off, temporally modulated, or controlled in its brightness, as needed.

The light modulator 12 is provided as a slit-type transmission grating. In order to illuminate the slits as homogeneously as possible and, thus, to use the radiation of the illumination source 13 as efficiently as possible, collimator optics comprising anamorphotic optics 23 are provided which cause line-shaped illumination. Arranged preceding (or, alternatively, following) the light modulator 12 is the filter 21, which is provided as an IR bandpass filter and is adapted to the centroid wavelength of the IR LED. The bandpass width is between 10 and 50 nm, so that undesired spectral components of the light source 13 are suppressed.

A top view of the transmission grating is shown by way of example in FIG. 8. The transmission grating consists of a slit-shaped stop including a periodic grating structure 36. This grating slit is located in or near the middle of the image so as to ensure the maximum possible lock-in range of the autofocus device. Optionally, as is evident from FIG. 8, additional grating slits 37 having other grating periods can be provided so as to optimize the image contrast on the camera by selecting the grating period. The selection is preferably effected by a suitable readout of the 2D camera 16. It is also possible to provide a narrow slit 35 without a grating structure. The slit-image light reflected by the glass/liquid interface is imaged onto a separate part of the camera 16. This allows to roughly determine defocusing outside the actual lock-in range, on the basis of the imaged brightness distribution via the slit. Thus, pre-focusing is possible even if no contrast signal from the grating is present at the camera 16 yet. Then the control device 26 can determine in which direction z shifting has to be effected, i. e. how the drive 27 should be controlled to return to the primary lock-in range. If the slit is sufficiently narrow, brightness is higher due to confocal suppression at the camera 16. The necessary shifting path into the primary lock-in range can be derived from the slope of the brightness distribution. This is carried out by the control device 26.

At the additional beam splitter 15 a light trap 34 is provided, which absorbs radiation from the light modulator 12 that would be transmitted. The light trap 34 is preferably provided as a plate of a strongly absorbing material, e. g. as a polished NG1 plate, that is inclined with respect to the optical axis. NG1 is a strongly absorbing, black glass.

The dichroic beam splitter 11' reflects only radiation of the wavelength guided in the autofocus beam path behind the bandpass filter 21. Other spectral components are transmitted. For this purpose, the beam splitter 11' comprises an interference layer which largely transmits radiation below 800 nm at an angle of incidence of 45° and largely reflects radiation having the centroid wavelength of the IR LED. The beam splitter 11' may also have a wedge angle so as to avoid interferences, which would compromise the microscope of FIG. 7 in case it is a laser scanning microscope. In order to be able to work also with non-linear fluorescence excitation, which also uses IR radiation in the microscope for sample imaging, the beam splitter 11' may also have bandpass-like spectral properties, so that wavelengths above the autofocus spectral range (e. g. above 840 nm) are also largely transmitted even at a 45° angle of incidence. Of course, such beam splitter features may also be used in other embodiments.

Further, it is preferably possible to make the beam splitter exchangeable, e.g. by means of a changing wheel or any other changing mechanism.

Preceding the image of the modulation object's image that is located in the sample, or preceding its intermediate image 30, there are cut-off filters 33 which ensure that only radiation of the corresponding spectral autofocus range reaches the camera 16. Other types of radiation, which may come from the image of the sample, e. 9. exciting radiation or fluorescence radiation in the case of a laser scanning microscope, are suppressed additionally.

The imaging optics 29 image the modulation object's image located in the sample or the intermediate image 30, reflected at an interface, e.g. the glass/liquid interface, onto the camera 16. The imaging optics 29 may be composed, for example, of a tubular lens 32 and a standard objective 31 having a small numerical aperture (e. g. NA=0.2).

Figure 9:
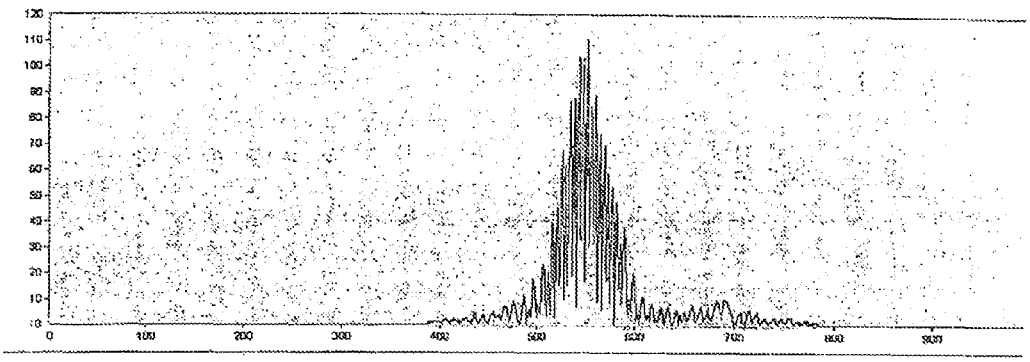
FIGS. 9 to 11 show contrast signals emitted by a camera of the autofocus device.
Figure 10:
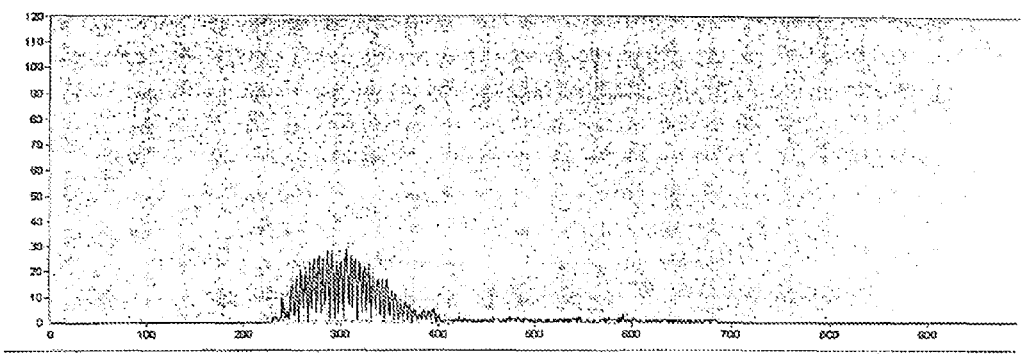

FIGS. 9 and 10 show the contrast signal of the camera 16 in the autofocus system, e. g. of the construction according to FIG. 7. FIG. 9 shows the contrast signal in the middle of the image field, and FIG. 10 shows the contrast signal on the edge of the image field. in this case, the contrast signal is plotted, in both Figures, in arbitrary units against the pixel number of the camera 16 which is of line-type here by way of example.

The lock-in range of the autofocus system is predetermined by the range of the z shift of the objective 4 (or of the interface), in which there is still an evaluable contrast signal on the autofocus camera. For this purpose, two conditions have to be fulfilled:
  1. The contrast signal must still be within the image field.
  2. The contrast signal must have a sufficient signal level that is significantly above noise level.

The holding range in which the focus can be held by readjustment is limited by the maximum allowable range of the z shift of the focal plane into the sample. In case the center of contrast is located in the middle of the image field, when the focal plane of the microscope objective 4 is precisely on the interface, the holding range is exactly half the size of the lock-in range. This is the case in the representation of FIG. 9.

It is evident now from FIGS. 9 and 10 that, when shifting the center of contrast, there is decrease in contrast from the middle of the image field to the edge of the image field from approximately 110 to approximately 30. This deterioration of the signal-to-noise ratio results mainly from spherical aberration and from coma, two image defects which always increase towards the edge of the image field. A contrast level of 30 is just sufficient to be reasonably evaluated. For this reason, the image field size must be selected such on the inclined autofocus camera that the contrast level on the margin of the lock-in range is just sufficient. The size of the camera is adapted accordingly.

Therefore, a further embodiment is optionally provided which is indicated in FIG. 7, by way of example, in broken lines. A longitudinal adjusting mechanism 40 is provided there which varies the distance between the autofocus objective 31 and the autofocus camera 16. For this purpose, the objective 31 may be selectively moved with respect to the fixed camera 16, or the camera 16 may be moved with respect to the fixed objective 31 along the optical axis. All known drive techniques, such as spindle drives, stepper motors, direct current motors, piezo actuators, etc., are suitable for the preferably electronically controlled longitudinal adjusting mechanism.

Variation of the distance between the autofocus objective 31 and the camera 16 is only one example of the general, basic principle of longitudinal adjustment of the camera 16 with respect to the image plane of the autofocus image. Most simply, the longitudinal adjusting mechanism may cause shifting of the camera 16, of the imaging optics 29 or of the light modulator 12.

This embodiment avoids the described limitation of the lock-in range or of the holding range, respectively.

Now, the distance between the autofocus objective and the autofocus camera is adapted to the desired holding range such that the center of the contrast signal is always located in the middle of the image field. For this purpose, the following steps are carried out:
  1. Using the z drive 27 of the microscope, the interface is moved into the focal plane of the microscope objective 4. This is the starting position for the extended holding focus mode. The center of the contrast signal is now in the middle of the image field of the autofocus objective 31, where the image defects are at a minimum.
  2. The focal plane of the microscope objective 4 is moved into the sample with the help of the z drive 27. Simultaneously, the distance between the autofocus objective 31 and the camera 16 is varied such that the center of contrast remains in the middle of the image field of the autofocus objective 31.
  3. Once the desired focal plane has been set, the already described holding focus function is activated. Thus, any defocusing is compensated for by the z drive, while the distance between the autofocus objective 31 and the camera 16 remains constant. Due to the holding focus function, the center of contrast still remains in the middle of the image field of the autofocus objective 31 and, thus, in the middle of the camera 16.

Figure 11:
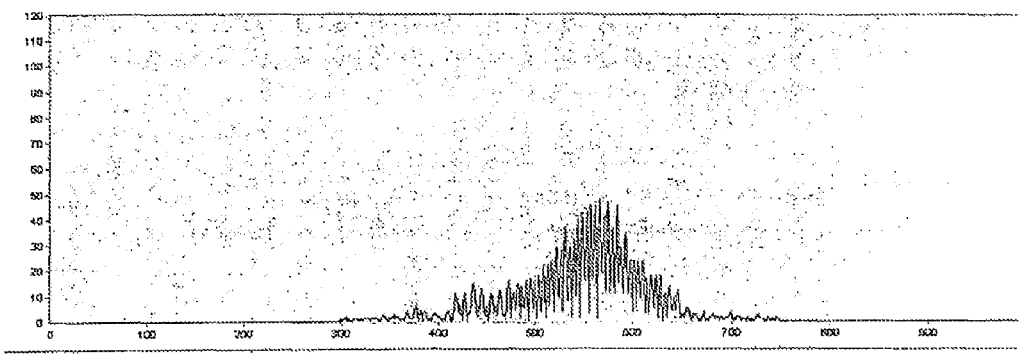

The effect of the longitudinal adjustment is shown in FIG. 11, in which the contrast signal is in the middle of the image field again. Compared with FIG. 10, the signal strength is improved by 67%, to a level of approximately 50. Due to this possibility of adjustment or this procedure, the lock-in range or holding range is no longer limited by the image field size of the autofocus objective 31. The catch range can be considerably extended, typically doubled.

The lock-in range or holding range is limited only by the image defects in the middle of the image field of the autofocus objective 31. These image defects are mainly spherical aberrations. Aberrations which considerably increase towards the edge of the image field, especially coma and curvature, now no longer cause interference. In addition, other problems appearing on the margin of the image field, such as illumination down edge, vignetting, and reflections, etc., are avoided.

Since the contrast signal remains in the middle of the image field, the light modulator 12 may also be made smaller. The contrast signal now no longer needs to extend over the entire image field of the objective 4 in order to maximize the lock-in range. This results in less autofocus light being coupled into the microscope beam path, thus reducing the scattered-light background on the autofocus camera 16. If a smaller (i.e. shorter) light modulator 12 is used, it is also possible to use a smaller and, thus, more inexpensive camera chip for the autofocus camera 16.

The structure of the light modulator 12 that is imaged onto the camera 16, the angle of tilt of the camera 16, the resolution of the camera, and statistical intensity variations during measurement influence the precision of adjustment of the z position. In order to be able to change the precision of adjustment, for example, during holding the focus, which adjustment may also depend on the microscope objective, the light modulator 12 may comprise several grating structures located next to each other and having different periods may be evaluated and/or the angle of inclination of the light modulator 12 or of the camera 16, may be adapted according to a precision of adjustment required for the measurement. The latter variant is shown in broken lines in FIG. 7, where an angle-adjusting mechanism 41 is provided.

Once the holding-focus adjustment operation has been completed, the angle of the camera 16, for example, can thus be adjusted, preferably by electronic means, according to pre-defined requirements of precision. Adjustment of the angle between the camera 16 and the image of the modulation object is most simply effected by tilting of the camera 16 or the light modulator 12 by means of a suitable angle-adjusting mechanism.

All known techniques are suitable for this purpose, such as spindle drives, stepper motors, direct current motors, linear motors, piezo actuators, etc. The precision resolution can be adapted in the case of a suitable angle and an accordingly selected grating with a suitable grating distance.

The described adjusting mechanisms 40, 41 emit an adjusting signal which is supplied to the control device 26 of the autofocus device.

The following applies to all embodiments of the microscope 1 comprising an autofocus device:

Of course, the described improvements with respect to the lock-in range or adjustment of the positioning precision can be employed not only for the construction of FIG. 7, but for all embodiments.

For on-line tracking it may be required to produce minimal influences by structured illumination, i. e. by the image of the modulation object. Then a stripe pattern can be projected as a modulation object onto the sample, said pattern being laterally shifted in an alternating manner with a high cycle rate (>30 Hz). For two positions, there would be a phase shift by 180°; for three positions, there would be a phase shift by 120°. The grating structure (grating constant, bright/dark ratio) may be easily adapted, in terms of control, at the electronic light modulator 12 such that, averaged over time, a homogeneous illumination is generated. It is also possible to adapt the optimal grating structure to the actual used objective 4 or its NA or magnification.

A further advantage of an adjustable, especially controllable, light modulator 12 and, thus, of a variable autofocus illumination structure consists in that, once an object has been found, one can illuminate only the interesting areas of the object field. This allows to increase the image contrast for the tracking apparatus, optionally also for the normal detection channel.

In principle, the structured autofocus illumination, e.g. by means of LCD or DMD, can also be realized in a transmitted-light microscope and/or as dark field illumination. However, in transmitted light, the use is then limited to transparent sample carriers and to scattering or fluorescent samples.

In all variants of the autofocus and tracking system, a computer control and evaluation device (e.g. a computer) is used, which performs signal analysis and control of the actuator (z drive, x-y table, filter, etc.). Evaluation and control can be implemented by firmware and/or software technology. This control and evaluation device controls the entire sequencing described herein.

Instead of adjustable, e.g. electrically switchable light modulators (e. g. LCD, DMD), static light modulators (transmission or phase gratings) can also be used. The projected modulation object may be shifted at the sample by tiltable plane plates or other apparatuses. It may also be possible to exchange the gratings in order to vary the grating constant or grating structure. As explained, it is also possible to use a plane grating structure that comprises several different grating periods, for example 2 to 10 adjacent stripe gratings with different grating frequencies.

This exemplifies that the light modulator may also be line-shaped and need not necessarily be two-dimensional.

However, since the autofocus method according to the invention preferably uses plane (two-dimensional) cameras, it is possible, in the case of several grating lines, to select the best-suited grating for each case of application by reading out the corresponding camera lines, without having to perform any mechanical changes (exchanging the grating). Basically, light modulators 12 that are perpendicular to the optical axis are easier to implement as transmission modulators, whereas inclined light modulators 12 are easier to realize as reflection modulators. If very small objects are to be detected by the tracking system, it may happen that a sufficiently high-frequency illumination modulation is no longer possible. In this case, illumination without spatial modulation and evaluation of only the intensity of the scattered or reflected signals are possible. As space-resolving detectors, not only CCD cameras, but also CMOS cameras as well as all other kinds of digital cameras may be used.

The autofocus device is designed to automatically focus to a specific area of the sample or to keep said area in the focal plane of the objective. For this purpose, an offset (typically 0 . . . 1000 µm) between the interface and the relevant sample plane may be defined. If said offset is varied in steps, it is also possible to record so-called z-stacks of images, wherein each image is at a defined and controlled distance from the interface. The arrangement may be used in connection with all common contrast methods of microscopy, including fluorescence, transmitted light, phase contrast, interference contrast, polarization contrast, incident light, luminescence, CARS (=Coherent Anti-Stokes Raman Scattering), OCT (=Optical Coherence Tomography), SPIM (=Selective Plane Illumination) etc.

Any method steps or particular manners or modes of operation set forth in this description are realized by a control unit belonging to the autofocus device, for example in the control device 26. Of course, a control unit already present in the microscope 1 anyway may also assume the corresponding control tasks.

Operation of the microscope comprising the autofocus device according to the invention may take place such that the image of the sample is first focused visually or by means of a known software autofocus system. Next, the autofocus device of the above-described type is activated and ensures that the distance between the sample plane of interest, for example a glass/liquid interface, and the set focal plane of the microscope objective 4 remains constant. For this purpose, the drive 27 is controlled such that the maximum contrast always stays at the same location of the camera 16. This functionality realizes a so-called holding focus which ensures a constant focus position even in the case of inevitable drifting.

In order to be able to measure as far as possible into the sample, the camera 16 may be arranged asymmetrically to the respective optical axis, (e. g. the optical axis oa2 in FIG. 7), so that an asymmetric lock-in range results. For example, the maximum contrast may be near an edge of the lock-in range right from the beginning, if a glass/liquid interface coincides with the set focal plane of the microscope objective 4. The other edge of the lock-in range then corresponds to the maximum distance from the glass/liquid interface to the set focal plane, at which the focus can still be fixed, i. e. to the maximum holding range.

Depending on the objective magnifications, lock-in or holding ranges of from 10 µm to 10 mm can be achieved. The resolution in the z plane is from 5 nm to 5 µm, depending on the objective magnification of the numerical aperture. Thus, the z resolution is always at least 5 times better than the depth of focus of the microscope objective 4 used.

The invention claimed is:

1. A microscope comprising:
    a microscope beam path;
    an objective having a focal plane located within a sample volume; and
    an autofocus device, the autofocus device including
        a light modulator that generates a luminous, two-dimensional, intensity-modulated modulation object,
        autofocus illumination optics, which comprise a beam splitter located, such that the autofocus illumination optics images the luminous two-dimensional, intensity-modulated modulation object via the beam splitter to form an image of the modulation object in the sample volume such that the two-dimensional, intensity-modulated modulation object's two dimensional image is located in the focal plane of the objective and in a central portion of the field of the objective, and wherein the beam splitter couples the autofocus illumination optics with the microscope beam path;
        an autofocus camera that records a two-dimensional image of the two dimensional, intensity-modulated modulation object, said camera having a camera image plane; and
        autofocus imaging optics, which image the luminous two dimensional intensity-modulated modulation object's image located in the sample volume into an autofocus image plane;
    wherein the camera is positioned such that the camera image plane is inclined relative to the autofocus image plane and intersects the autofocus image plane.

2. The microscope as claimed in claim 1, wherein the light modulator is controllable and is controlled to generate a spatially or temporally intensity-modulated modulation object, and the camera detects the contrast for this spatial or temporal modulation.

3. The microscope as claimed in claim 2, wherein the light modulator comprises an illuminated liquid crystal display (LCD) or digital micromirror device (DMD) element.

4. The microscope as claimed in claim 1, wherein the imaged modulation object comprises at least one periodic structure.

5. The microscope as claimed in claim 4, wherein the imaged modulation object comprises one or several stripe-grating structures.

6. The microscope as claimed in claim 1, wherein the autofocus illumination optics comprise a second beam splitter located between the light modulator and the first beam splitter.

7. The microscope as claimed in claim 6, wherein the intermediate image is located between the intermediate image generating optics and the second beam splitter.

8. The microscope as claimed in claim 6, further comprising a radiation trap, which absorbs radiation transmitted by the second beam splitter.

9. The microscope of claim 8, further comprising a control device, which receives the path signal and regulates a contrast signal of the camera to a maximum value by controlling the longitudinal adjusting mechanism.

10. The microscope as claimed in claim 1, wherein the camera image plane is at an angle of 10° to 80° to an optical axis of the autofocus imaging optics.

11. The microscope as claimed in claim 1, wherein the autofocus illumination optics couple the modulation object into an incident-light illumination beam path of the microscope.

12. The microscope as claimed in claim 11, wherein the autofocus imaging optics couple the camera with the microscope beam path in parallel to the incident-light illumination beam path of the microscope.

13. The microscope as claimed in claim 11, wherein the beam splitter is coupled to the microscope beam path parallel to an incident-light illumination beam path of the microscope.

14. The microscope as claimed in claim 1, further comprising a second camera, whose image plane is inclined with respect to that of the first camera and onto which the autofocus imaging optics also image the modulation object's image.

15. The microscope as claimed claim 1, wherein the light modulator operates by transmission.

16. The microscope as claimed claim 15 wherein the light modulator comprises a fixed transmission grating.

17. The microscope as claimed claim 1, wherein the beam splitter comprises a dichroite.

18. The microscope as claimed in claim 1, wherein the light modulator is illuminated by one or more light emitting diodes (LEDs).

19. The microscope as claimed claim 1, wherein the light modulator emits light within an autofocus spectral range or is illuminated within the autofocus spectral range, wherein the autofocus spectral range is other than a spectral range used for sample imaging in the microscope, and the autofocus imaging optics comprise at least one filter that suppresses or filters out spectral components located outside the autofocus spectral range.

20. The microscope as claimed claim 1, wherein the autofocus imaging optics comprise intermediate image generating optics which are arranged preceding the camera and which image the modulation object's image into an intermediate image and then on the camera.

21. The microscope as claimed in claim 20, wherein the intermediate image is located between the intermediate image generating optics and the second beam splitter.

22. The microscope as claimed in claim 1, wherein the light modulator is illuminated by means of anamorphotic optics.

23. The microscope as claimed in claim 1, further comprising a longitudinal adjusting mechanism for adjusting a distance between the camera and the autofocus imaging optics, said longitudinal adjusting mechanism including a position feedback indicating an adjustment stroke by means of a path signal.

24. The microscope as claimed in claim 23, wherein the adjusting mechanism comprises one or more of a spindle drive, a stepper motor, a direct current motor, a linear motor, a piezoelectric actuator.

25. The microscope of claim 1, further comprising an angle adjusting mechanism which adjusts an angle between the camera image plane and the imaging optics' image plane, said angle-adjusting mechanism including a position feedback to indicate an angle of adjustment via an angle signal and preferably adjustably tilting the camera.

26. The microscope as claimed in claim 25, further comprising a control device, which receives the angle signal and adjusts the autofocus resolution by controlling the angle adjusting mechanism.

27. The microscope of claim 1, wherein an angle adjusting mechanism is provided which adjusts an angle between the focal plane and the modulation object's image, said angle adjusting mechanism including a position feedback to indicate the angle of adjustment via an angle signal and preferably tilting the modulation object.

28. The microscope as claimed in claim 27, further comprising a control device, which receives the angle signal and adjusts the autofocus resolution by controlling the angle adjusting mechanism.

29. A microscope comprising:
a microscope beam path;
an objective having a focal plane located within a sample volume; and
an autofocus device, the autofocus device including
a light modulator that generates a luminous, two-dimensional, intensity-modulated modulation object;
autofocus illumination optics, which comprise a beam splitter located such that the autofocus illumination optics images the two-dimensional, intensity-modulated luminous modulation object via the beam splitter to form an image of the two-dimensional, intensity-modulated modulation object in the sample volume such that the two-dimensional, intensity-modulated modulation object's image is inclined relative to the focal plane of the objective and intersects the focal plane of the objective and is located in a central portion of the field of the objective, and wherein the beam splitter couples the autofocus illumination optics with the microscope beam path,
an autofocus camera that records a two-dimensional image of the two dimensional, intensity-modulated modulation object, said camera having a camera image plane,
autofocus imaging optics, which image the modulation object's image located in the sample volume into an autofocus image plane,
wherein the camera is positioned such that the camera image plane is located in the autofocus image plane.

30. The microscope as claimed in claim 29, wherein the light modulator is controllable and is controlled to generate a spatially or temporally intensity-modulated modulation object, and the camera detects the contrast for this spatial or temporal modulation.

31. The microscope as claimed in claim 30, wherein the light modulator comprises an illuminated liquid crystal display (LCD) or digital micromirror device (DMD) element.

32. The microscope as claimed in claim 29, wherein the imaged modulation object comprises at least one periodic structure.

33. The microscope as claimed in claim 32, wherein the imaged modulation object comprises one or several stripe-grating structure(s).

34. The microscope as claimed in claim 29, wherein the autofocus illumination optics comprise a second beam splitter located between the light modulator and the first beam splitter.

35. The microscope as claimed in claim 34, wherein the intermediate image is located between the intermediate image generating optics and the second beam splitter.

36. The microscope as claimed in claim 34, further comprising a radiation trap, which absorbs radiation transmitted by the second beam splitter.

37. The microscope as claimed in claim 29, wherein the light modulator is at an angle of 10° to 80° to an optical axis of the autofocus illumination optics.

38. The microscope as claimed in claim 29, wherein the autofocus illumination optics couple the modulation object into an incident-light illumination beam path of the microscope.

39. The microscope as claimed in claim 38, wherein the autofocus imaging optics couple the camera with the microscope beam path in parallel to the incident-light illumination beam path of the microscope.

40. The microscope as claimed in claim 39, wherein the beam splitter is coupled to the microscope beam path parallel to an incident-light illumination beam path of the microscope.

41. The microscope as claimed in claims 29, further comprising a second camera whose image plane is inclined with respect to that of the first camera and onto which the autofocus imaging optics also image the modulation object's image.

42. The microscope as claimed claim 29, wherein the light modulator operates by transmission.

43. The microscope as claimed claim 42, wherein the light modulator comprises a fixed transmission grating.

44. The microscope as claimed claim 29, wherein the beam splitter is a dichroite.

45. The microscope as claimed in claim 29, wherein the light modulator is illuminated by one or more light emitting diodes (LEDs).

46. The microscope as claimed in claim 29, wherein the light modulator emits light within an autofocus spectral range or is illuminated within the autofocus spectral range, wherein the autofocus spectral range is other than a spectral range used for sample imaging in the microscope, and the autofocus imaging optics comprise at least one filter that suppresses or filters out spectral components located outside the autofocus spectral range.

47. The microscope as claimed claim 29, wherein the autofocus imaging optics comprise intermediate image generating optics which are arranged preceding the camera and which image the modulation object's image into an intermediate image and then on the camera.

48. The microscope as claimed in claim 47, wherein the intermediate image is located between the intermediate image generating optics and the second beam splitter.

49. The microscope as claimed in claim 29, wherein the light modulator is illuminated by means of anamorphotic optics.

50. The microscope as claimed in claim 29, further comprising a longitudinal adjusting mechanism for adjusting a distance between the camera and the autofocus imaging optics, said longitudinal adjusting mechanism including a position feedback indicating an adjustment stroke by means of a path signal.

51. The microscope of claim 50, further comprising a control device, which receives the path signal and regulates a contrast signal of the camera to a maximum value by controlling the longitudinal adjusting mechanism.

52. The microscope as claimed in claim 50, wherein the adjusting mechanism comprises one or more of a spindle drive, a stepper motor, a direct current motor, a linear motor, a piezoelectric actuator.

* * * * *

UNITED STATES PATENT AND TRADEMARK OFFICE
CERTIFICATE OF CORRECTION

PATENT NO. : 8,643,946 B2  
APPLICATION NO. : 12/305183  
DATED : February 4, 2014  
INVENTOR(S) : Peter Westphal et al.

Page 1 of 1

It is certified that error appears in the above-identified patent and that said Letters Patent is hereby corrected as shown below:

On the Title Page

Under (75) Inventors, delete "Daniel Bublitz, Jena" and insert --Daniel Bublitz, Rausdorf--

In the Specification

Col. 13, line 9, delete "9" and insert --g--

Col. 13, line 22, delete "in" and insert --In--

Signed and Sealed this  
Seventh Day of October, 2014

Michelle K. Lee  
*Deputy Director of the United States Patent and Trademark Office*